(12) United States Patent
Typrin

(10) Patent No.: US 8,861,689 B1
(45) Date of Patent: Oct. 14, 2014

(54) SYSTEM AND METHOD TO FACILITATE COMMUNICATION BETWEEN USERS VIA DIFFERENT MODALITIES

(75) Inventor: Marcello Typrin, Menlo Park, CA (US)

(73) Assignee: Amazon Technologies, Inc., Reno, NV (US)

( * ) Notice: Subject to any disclaimer, the term of this patent is extended or adjusted under 35 U.S.C. 154(b) by 85 days.

(21) Appl. No.: 13/492,754

(22) Filed: Jun. 8, 2012

(51) Int. Cl.
*H04M 1/64* (2006.01)

(52) U.S. Cl.
USPC ............. 379/88.22; 379/88.14; 704/203; 704/209

(58) Field of Classification Search
USPC ............. 379/88.14, 88.18, 88.22, 88.11; 704/209, 203, 269
See application file for complete search history.

(56) References Cited

U.S. PATENT DOCUMENTS 8,131,556 B2 * 3/2012 Barton et al. ............. 704/270.1
2008/0249778 A1 10/2008 Barton et al.

* cited by examiner

*Primary Examiner* — Simon King
(74) *Attorney, Agent, or Firm* — Lowenstein Sandler LLP

(57) ABSTRACT

Methods and systems to facilitate communications between users via different modalities. A method includes identifying, by a first user device, a voice call originating from a second user device, and presenting a user interface to a user of the first user device, where the user interface provides an option to respond to the voice call by voice and an option to respond to the voice call in a text form. The method further includes detecting that the user of the first user device has selected the option to respond to the voice call in the text form, and causing a user response to the voice call to be converted into voice data for the second user device.

21 Claims, 15 Drawing Sheets

SYSTEM AND METHOD TO FACILITATE COMMUNICATION BETWEEN USERS VIA DIFFERENT MODALITIES

BACKGROUND

A large and growing population of users is using mobile phones for a variety of purposes, including keeping in touch with family members, conducting business, and communicating in the event of an emergency. Phone calls and text messaging are two of the most common modalities of phone-based communications, including phone-based communications between 2 users or 3 or more users (e.g., conference calls, group text messaging, etc.). A phone call implies a request to use the talking-listening modality while a text message implies a request to use the typing-reading modality. However, sometimes users may not be able to effectively communicate with each other using a single modality. For example, speaking on the phone may not be practical or possible for a user during a meeting or in a noisy place (e.g., at a bar, a concert or a conference). Similarly, text messages may not be well suited when a user is driving, multi-tasking or otherwise distracted. When users cannot agree on the modality, the result is missed calls that are routed to voicemail and text messages going unanswered for long periods of time.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
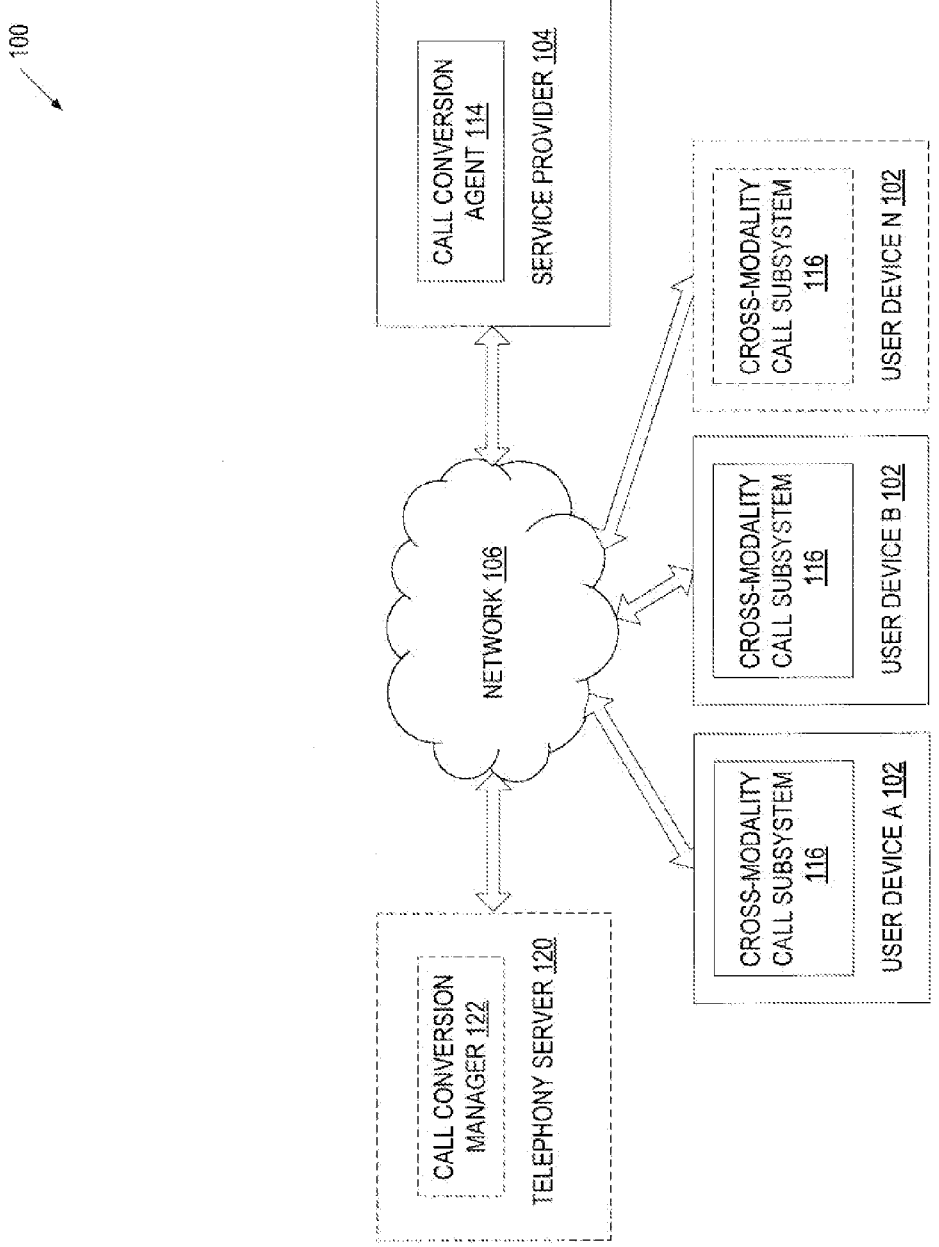
FIG. 1 is a block diagram of an exemplary network architecture in which embodiments of the invention may operate.

Methods and systems to facilitate communication between users using different modalities are described. A modality can be defined as a type of communication between a user and a user device. A user device may be any mobile or content rendering device such as a cellular telephone, a personal digital assistant (PDA), a portable media player, a tablet computer, a netbook, an electronic book reader, and the like. Examples of modalities used for communication via user devices may include a talking-listening modality (e.g., during a voice call), a typing-reading modality (e.g., during text messaging), etc. Embodiments of the present disclosure provide a user experience that allows users to communicate with each other using different modalities. For example, user A can communicate with user B using the talking-listening modality while user B can communicate with user A using the typing-reading modality. In another example, user A, user B, user C, user D and user E may participate in a conference call, in which users A, B and D each communicate using the talking-listening modality and users C and E each communicate using the typing-reading modality.

In some embodiments, when a voice call of user A is received at a user device of user B, user B is presented with a user interface that provides an option to respond to the voice call by voice and an option to respond to the voice call by text. If user B selects the response by text option, voice data from the user device of user A is converted into text data and presented to user B in the visual (e.g., text) form. In addition, text data entered by user B is converted into voice data and provided to the user device of user A as part of the voice call.

Voice calls can refer to calls involving exchange of voice data between participants, including, for example, circuit-switched telephone calls, voice over IP (VoIP) telephone calls, and so on. A voice call may be between 2 or more participants and may include a direct voice call between participants referred to as a point-to-point voice call, a teleconference call (e.g., a voice call between participants using a bridge), a video conference call (a teleconference using video technology), a web conference call (a teleconference using collaborative web browsing), and so on. Text messaging or communications in text form can refer to real-time communications that are presented to a participant in a visual form including, for example, text data, image data, sign language data, and so on. Real-time communications may include short message service (SMS) communications, multimedia messaging service (MMS) communications, communications via an instant messaging protocol (e.g., extensible messaging and presence protocol (XMPP), iMes sage protocol, etc.), communications via other IP communication protocols, etc.

Embodiments of the present disclosure provide for mixed modality interactions between users. As a result, the user experience with user devices is improved, as well as user satisfaction with a network operator's service and/or with manufacturers of user devices.

FIG. 1 is a block diagram of exemplary network architecture 100 in which embodiments of the invention may operate. The network architecture 100 may include a service provider 104 and multiple user devices 102 coupled to the service provider 104 via a network 106 (e.g., public network such as the Internet, private network such as a local area network (LAN) or an operator network).

The user devices 102 are variously configured with different functionality to enable different types of communication between end users and/or consumption of digital content, including, for example, electronic texts (e.g., eBooks, electronic magazines, digital newspapers), digital audio (e.g., music, audible books), digital video (e.g., movies, television, short clips), images (e.g., art, photographs), multi-media content and software updates. The user devices 102 may include any type of computing devices such as electronic book readers, portable digital assistants, mobile phones, laptop computers, portable media players, tablet computers, cameras, video cameras, netbooks, notebooks, desktop computers, gaming consoles, DVD players, media centers, and the like.

The service provider 104 (also referred to as a cloud server or a network server) may include one or more servers that provide various services to user devices 102 via the network 106. The servers(s) may be hosted by one or more machines (e.g., one or more server computer systems, routers, gateways) that have processing and storage capabilities to provide the functionality described herein.

Communication between the service provider 104 and a user device 102 may be enabled via any communication infrastructure. One example of such an infrastructure includes a wireless infrastructure that may be provided by a network operator that can be implemented using various data processing equipment, communication towers, etc. Alternatively, or in addition, the network operator may rely on satellite technology to exchange information with the user device 102. Yet alternatively, or in combination, the wireless infrastructure may be provided by an access point (e.g., WiFi access point) provider system.

Embodiments of the present disclosure allow users of user devices 102 to communicate with each other using different modalities. For example, user A can communicate with user B using the talking-listening modality while user B can communicate with user A using the typing-reading modality. In some implementations, user device A hosts a cross-modality subsystem 116 that identifies a voice call from user device B, and presents a user interface on user device A that provides several options for responding to the voice call (e.g., an option to respond to the voice call by voice and an option to respond to the voice call by text). If the user of user device A selects the response by text option, voice data from the user device B is converted into text data and presented to user A in the visual (e.g., text) form. In addition, text data entered by the user of user device A is converted into voice data and provided to the user device B as part of the voice call.

In some embodiments, the cross-modality subsystem 116 also (or alternatively) allows a user to respond to a text message via voice. In particular, the cross-modality subsystem 116 may identify a text message from user device B, and present a user interface on user device A that provides several options for responding to the text message (e.g., an option to respond by voice and an option to respond by text). If the user of user device A selects the response by voice option, text data from the user device B is converted into voice data and presented to user A in the audio form. In addition, voice data generated by user device A is converted into text data and provided to the user device B. Similarly, in some embodiments, users A through N may participate in a conference call (e.g., teleconference call, a video conference call, or a web conference call) or a group text messaging, in which each user device presents a user interface allowing the respective user to communicate via voice or text, irrespective of the modality used by other users.

Conversion between text data and voice data can be performed by a call conversion agent 114 hosted by the service provider 104. The call conversion agent 114 may provide automated speech recognition (ASR) to convert voice data into text data and/or text to speech (TTS) processing to convert text data into voice data. In some embodiments, the cross-modality call subsystem 116 communicates with the service provider 104 to request the desired conversion, as will be discussed in more detail below in conjunction with FIG. 2. In other embodiments, the cross-modality call subsystem 116 provides data to be converted to the telephony server 120 (e.g., a call conversion manager 122 hosted by the telephony server 120), which then communicates with the service provider 104 to request the desired conversion, as will be discussed in more detail below in conjunction with FIG. 3. The telephony server 120 may function as a voice over IP (VoIP) gateway that forwards calls to and from user devices 102 and communicates with cross-modality call subsystems 116 acting as VoIP clients. The telephony server 120 may include one or more machines (e.g., one or more server computer systems, routers, gateways) that have processing and storage capabilities to provide the functionality described herein.

Figure 2:
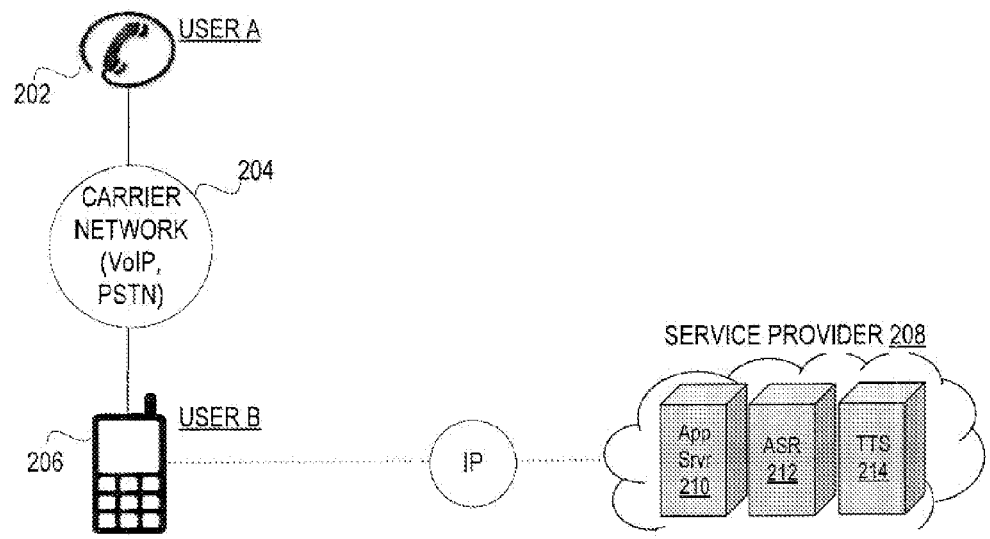
FIG. 2 illustrates an exemplary system for facilitating mixed modality interactions involving direct communication between a user device and a service provider, in accordance with some embodiments.

FIG. 2 illustrates an exemplary system for facilitating mixed modality interactions involving direct communication between a user device and a service provider, in accordance with some embodiments. Referring to FIG. 2, user A places a voice call via a user device 202 to user device 206 of user B. The voice call is handled by a carrier network 204, which may be, for example, a voice over IP (VoIP) network, a public switched telephone network (PSTN), etc. User device 206 receives ("terminates") the voice call and presents a user interface identifying the voice call to user B and providing an option to respond to the voice call by voice and an option to respond to the voice call by text. In the meantime, user device 206 captures the audio path of the voice call and maintains the telephony connection for the voice call.

If user B selects the response by text option, user device 206 invokes a text messaging application to allow user B to provide input in text form, and forwards the resulting text data to service provider 208 to be converted into voice data. Service provider 208 may include an application server 210 to communicate with various user devices and route user device requests to ASR server 212 or TTS server 214 depending on the requested functionality. When service provider 208 returns the voice data to the user device 206, the user device 206 transmits the voice data to user device 202 via carrier network 204 using the captured audio path. Alternatively, the service provider 208 may send the voice data to the carrier network 204, which then directs to the user device 202.

When user device 202 sends the next voice communication of user A to user device 206, user device 206 requests service provider 208 to convert that voice communication to text data, and invokes the text messaging application to present the text data to user B. User B may then respond by providing additional input, which will be converted and dispatched to user device 202, as discussed above. Alternatively, user B may choose not to respond by text but rather select an option to respond by voice, switching to the use of the same modality as that of user A.

In some implementations, the above functionality is provided using an operating system of user device 206, which captures the audio path of the voice call, seamlessly integrates the voice call with the native text messaging application of user device 206, and directly communicates with service provider 208 to cause text data to be converted into voice data and vice versa. As will be discussed in more detail below, a similar mechanism may be used to allow user B to respond to text messages of user A by voice.

Figure 3:
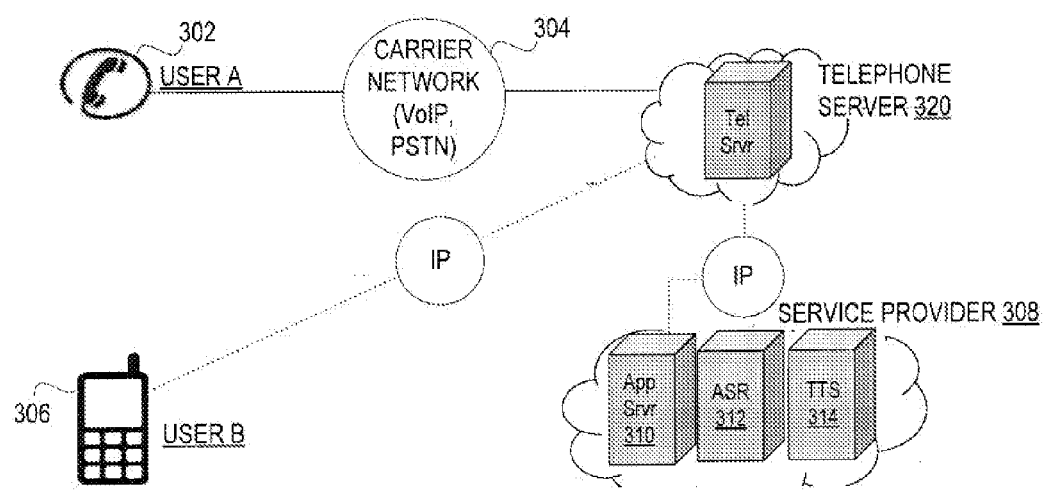
FIG. 3 illustrates an exemplary system for facilitating mixed modality interactions involving a telephony server, in accordance with some embodiments.

FIG. 3 illustrates an exemplary system for facilitating mixed modality interactions involving a telephony server, in accordance with some embodiments. Telephony server 320 obtains a bank of phone numbers (e.g., from a telecommunications provider) and assigns each user one of these phone numbers. When user A places a voice call via a user device 302 to a phone number assigned to user B, the voice call is handled by carrier network 304, and is terminated by telephony server 320. Telephony server 320 determines that the voice call is intended for user B and bridges the voice call to user device 306, waking up a client application on user device 306. In some embodiments, telephony server 320 functions as a VoIP gateway that performs signaling and transport for the client application (VoIP client) on user device 306.

When telephony server wakes up the client application on user device 306, the client application presents a user interface identifying the voice call to user B and providing an option to respond to the voice call by voice and an option to respond to the voice call by text. If user B selects the response by text option, the client application provides a user interface facilitating user input in text form, and forwards the resulting text data to telephony server 320, which then directs it to service provider 308 for conversion into voice data. Application server 310 receives the request of telephony server 320 and forwards it to TTS server 314 for processing. When service provider 308 returns the voice data to telephony server 320, the telephony server 320 transmits the voice data to user device 302 via carrier network 304.

When user device 302 sends the next voice communication of user A to user B, telephony server 320 determines, based on its records, that user B has chosen text messaging communication for this voice call, and requests service provider 308 to convert the received voice communication into text data. Telephony server 320 then forwards the text data to the client application on user device 306, which presents it to user B in the user interface as part of the conversation in text form and allows user B to respond, as discussed above. Alternatively, user B may choose not to respond by text but rather select an option to respond by voice, switching to the use of the same modality as that of user A. As will be discussed in more detail below, a similar mechanism may be used to allow user B to respond to text messages of user A by voice (e.g., when user A of user device 302 sends a text message and user B of user device 306 wishes to respond by voice).

Figure 4A:
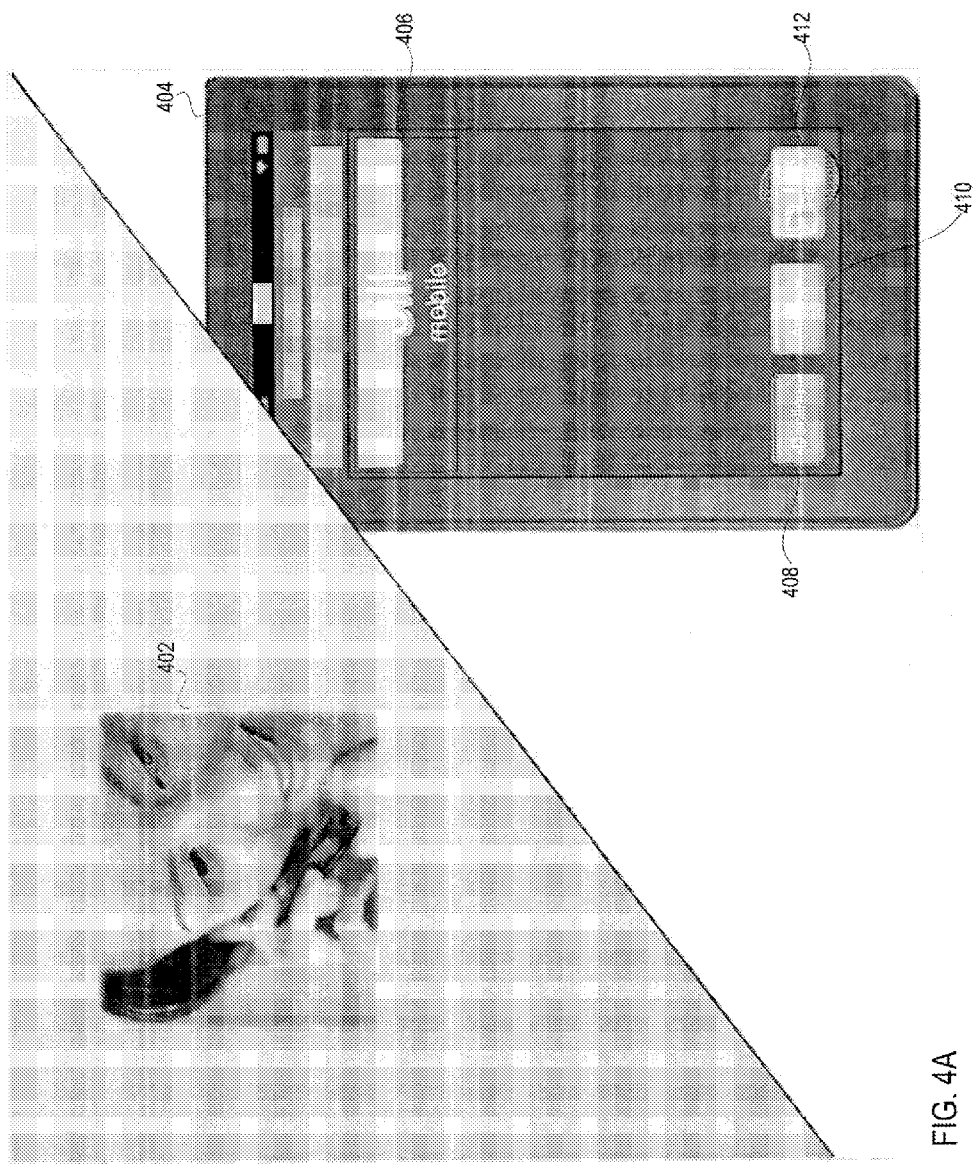
FIG. 4 illustrates exemplary user interfaces facilitating user interaction via different modalities, in accordance with some embodiments of the disclosure.
Figure 4B:
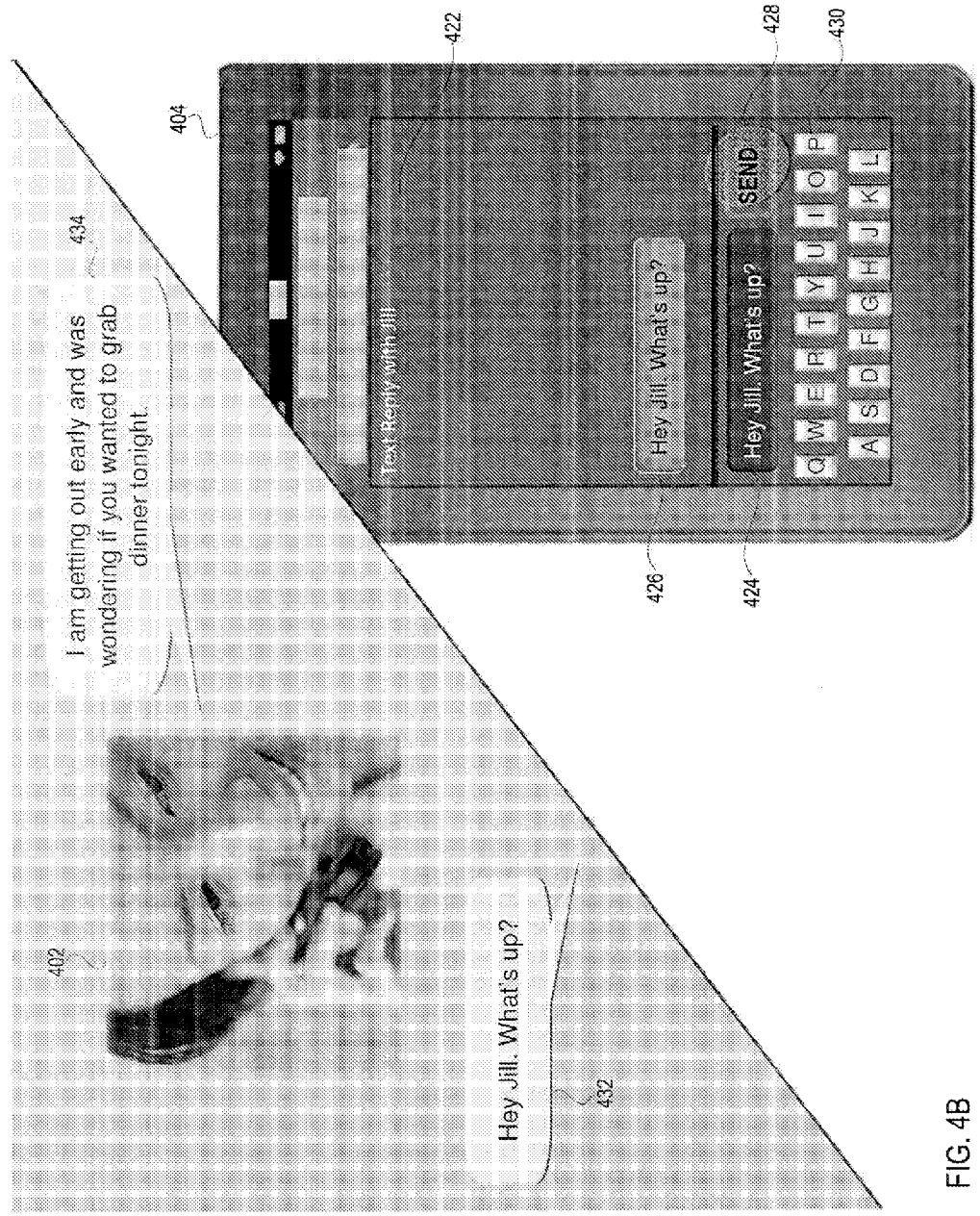
Figure 4C:
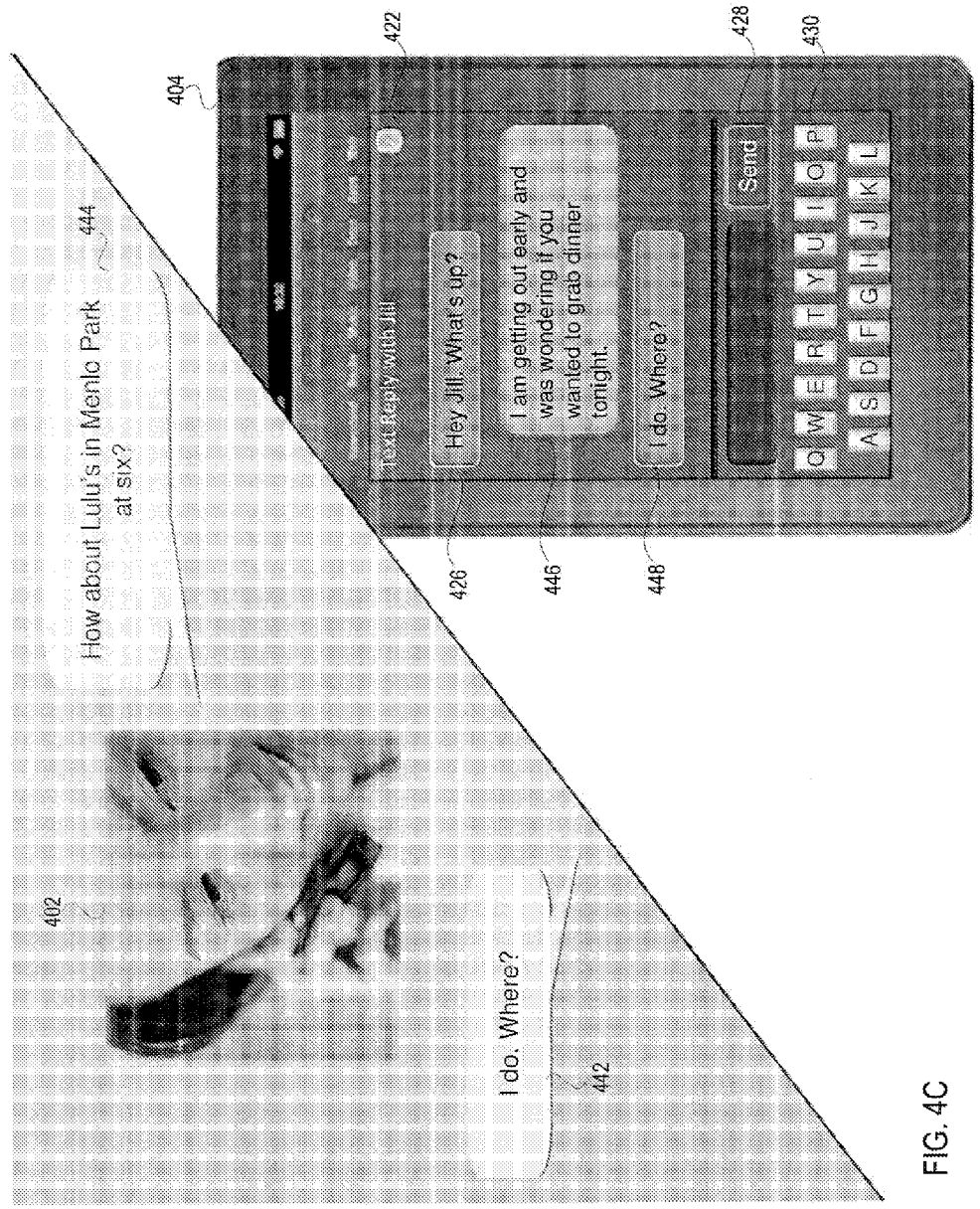

FIGS. 4A, 4B and 4C illustrate exemplary user interfaces facilitating user interaction via different modalities, in accordance with some embodiments of the disclosure. FIG. 4A includes an image 402 of a first user (Jill) calling a second user (Austin). Austin's phone 404 identifies Jill's voice call 406 on the screen and provides response options in the form of buttons—decline button 408, answer button 410 and text reply button 412. Austin may then activate button 412 to respond to the voice call via text messaging g (e.g., if Austin is in a meeting or a noisy place).

Referring to FIG. 4B, phone 404 presents a user interface that provides an indication 422 that Austin has selected to interact with Jill via text messaging, and allows Austin to enter his text response 424 using keyboard 430. Austin then activates send button 428 to send his response to Jill, which results in displaying his response on the Austin's phone 404 as part of the conversation and in providing his response 432 in audio form to Jill. Jill then responds by voice (response 434) using her phone.

Referring to FIG. 4C, phone 404 presents the conversation between Jill and Austin in text form (Austin's previous communication 426, Jill's response 446 and Austin's new input 448). His new response is provided to Jill's phone in audio form (response 442), which is followed by her response 444 via her phone.

Figure 5:
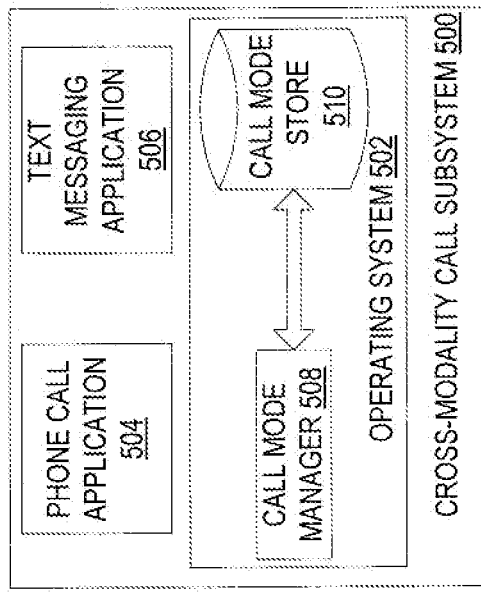
FIG. 5 is a block diagram of one embodiment of a cross-modality call subsystem.

FIG. 5 is a block diagram of one embodiment of a cross-modality call subsystem 500 hosted by a user device. The cross-modality call subsystem 500 includes a call mode manager 508, a call mode store 510, a phone call application 504 and a text messaging application 506. The components of the cross-modality subsystem 500 may represent modules that can be combined together or separated into further modules, according to some embodiments.

The call mode manager 508 may be part of the operating system 502 and may maintain the call mode store 510 to record preferred modality of the user for current user interaction(s). The call mode store 510 may represent any data structure such as a buffer, a table, a file, etc. The phone call application 504 may represent a native application running on the user device that is designated to enable the user to participate in phone calls with other users. The text messaging application 506 may represent a native application running on the user device that is designated to enable the user to exchange text messages with other users.

The call mode manager 508 receives a voice call from another user, captures the audio path of the voice call and maintains the telephony connection for the voice call. Upon receiving the voice call, the call mode manager 508 invokes the phone call application 504, which identifies the voice call to user B and provides an option to respond to the voice call by voice and an option to respond to the voice call by text. If the user selects the response by text option, the call mode manager 508 records this in the call mode store 510, invokes the text messaging application 506 to allow the user to provide input in text form, and forwards the resulting text data to a service provider for conversion into voice data. When the service provider returns the voice data, the call mode manager 508 transmits the voice data to the other user via the carrier network using the captured audio path.

When the call mode manager 508 receives a new voice communication for this call, the call mode manager 508 requests the service provider to convert that voice communication to text data, and triggers the text messaging application 506 to present the text data to the user. The user may then respond by providing additional input or may choose not to respond by text but rather select an option to respond by voice.

Alternatively, the call mode manager 508 may receive a text message from another user, and invoke the text messaging application 506, which presents the text message to the user and provides an option to respond to the text message by text and an option to respond to the text message by voice. If the user selects the response by voice option, the call mode manager 508 records this in the call mode store 510, requests the service provider to convert the text message into audio, invokes the phone call application 504 to allow the user to hear the audio and respond by voice, and forwards the resulting voice data to a service provider for conversion into text data. When the service provider returns the text data, the call mode manager 508 transmits the text data to the other user.

When the call mode manager 508 receives a new text message from the other user, the call mode manager 508 requests the service provider to convert that text message into audio, and triggers the phone call application 504 to allow the user interaction by voice.

Figure 6:
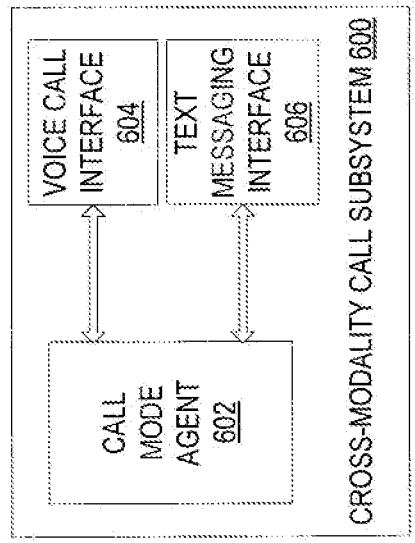
FIG. 6 is a block diagram of another embodiment of a cross-modality call subsystem.

FIG. 6 is a block diagram of one embodiment of a cross-modality call subsystem 600 hosted by a user device. The cross-modality call subsystem 600 includes a call mode agent 602 that runs on the operating system of the user device and can provide a voice call interface 604 and a text messaging interface 606. The components of the cross-modality subsystem 600 may represent modules that can be combined together or separated into further modules, according to some embodiments.

The call mode agent 602 receives a notification from a telephony server about a voice call from another user, and presents the voice call interface 604, which identifies the voice call to the user and provides an option to respond to the voice call by voice and an option to respond to the voice call by text. If the user selects the response by text option, the call mode agent 602 notifies the telephony server and presents the text messaging interface 606 to allow the user to provide input in text form, captures the resulting text data and forwards it to the telephony server, which then manages the conversion of the text data into voice data and transmits the voice data to the other user via the carrier network.

The call mode agent 602 may then receive a new communication converted into text and provide the text messaging interface 606 to present the text data to the user as part of a conversation. The user may then respond by providing additional input or may choose not to respond by text but rather select an option to respond by voice.

Alternatively, the call mode agent 602 may receive an initial communication in text form and provide the text messaging interface 606, which presents the text message to the user and provides an option to respond to the text message by text and an option to respond to the text message by voice. If the user selects the response by voice option, the call mode agent 602 notifies the telephony server, which requests the service provider to convert that text message into audio. The call mode agent 602 then presents the voice call interface 604 to allow the user to listen to the audio and provide a voice response. The call mode agent 602 captures the resulting voice data and forwards it to the telephony server.

Figure 7:
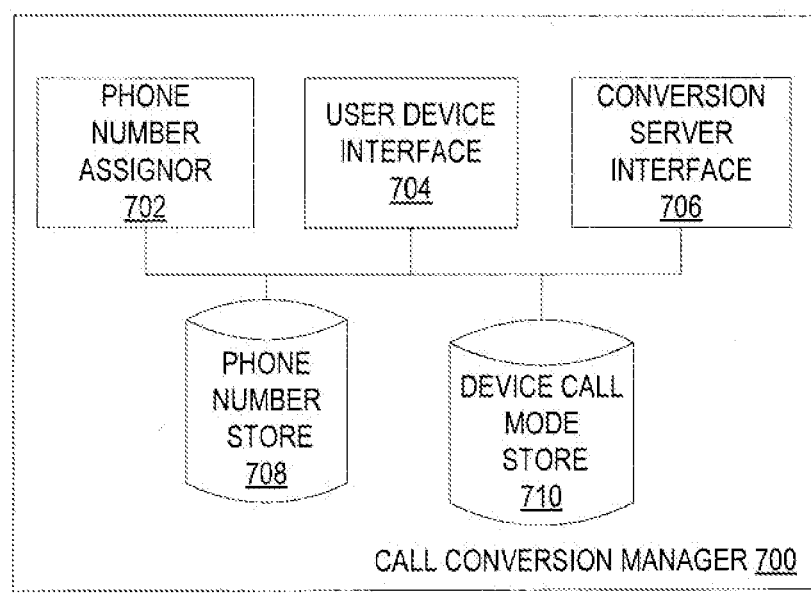
FIG. 7 is a block diagram of one embodiment of a call conversion manager.

FIG. 7 is a block diagram of one embodiment of a call conversion manager 700 hosted by a telephony server. The call conversion manager 700 may include a phone number assignor 702, a user device interface 704, a conversion server interface 706, a phone number store 708 and a device call mode store 710. The components of the call conversion manager 700 may represent modules that can be combined together or separated into further modules, according to some embodiments.

The phone number assignor 702 obtains a bank of phone numbers (e.g., from a telecommunications provider), assigns each user one of these phone numbers and stores the assignments in a phone number store 708. The phone number store 708 may represent a single data structure or multiple data structures (tables, databases, repositories, files, etc.) residing on one or more mass storage devices, such as magnetic or optical storage based disks, solid-state drives or hard drives.

When user A places a voice call or sends a text message to a phone number assigned to user B, the user device interface 704 receives this voice call or text message, determines that the voice call or text message is intended for user B and bridges the voice call or text message to the user device of user B. In some embodiments, the user device interface 704 functions as a VoIP gateway that performs signaling and transport for a client application (VoIP client) on the user device.

The user device interface 704 may then get a notification that user B has selected an option to respond to the received communication via a different modality than what was used by user A. The user device interface 704 may store this information in the device call mode store 710, which may be a single data structure or multiple data structures (tables, databases, repositories, files, etc.) residing on one or more mass storage devices, such as magnetic or optical storage based disks, solid-state drives or hard drives.

The user device interface 704 may receive a user communication from the user device of user B, determine, based on information stored in the device call mode store 710, that the user communication should be converted, and trigger the conversion server interface 706 to send a conversion request to a conversion service provider. When the conversion service provider returns converted data, the conversion server interface 706 may provide the converted data to the user device of user A via the carrier network or return it to the user device of user B.

When user A sends a new communication to user B, the conversion server interface 706 determines, based on its records, that the new communication should be converted, sends a conversion request to the conversion service provider, and then forwards the converted data to the user device of user B.

FIGS. 8, 9, 10 and 11 are flow diagrams of some embodiments of client-side methods. The methods are performed by processing logic that may comprise hardware (circuitry, dedicated logic, etc.), software (such as is run on a general purpose computer system or a dedicated machine), or a combination of both. In one embodiment, the methods are performed by a user device (e.g., a cross-modality call subsystem 116 of user device 102 of FIG. 1).

Figure 8:
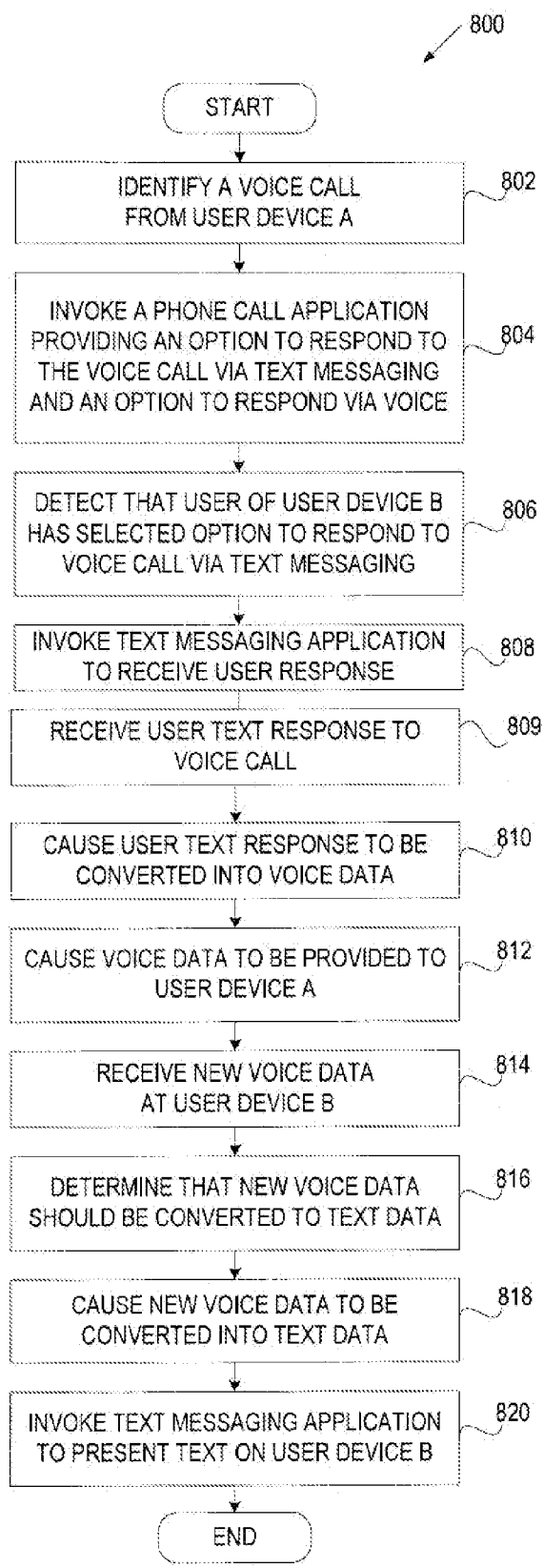
FIG. 8 is a flow diagram of one embodiment of a method for facilitating cross-modality interactions using direct communication between a user device and a conversion service provider.

FIG. 8 is a flow diagram of one embodiment of a method 800 for facilitating cross-modality interactions using direct communication between a user device and a conversion service provider. At block 802, user device B identifies a voice call from user device A. At block 804, user device B invokes a phone call application, which provides an option to respond to the voice call via text messaging and an option to respond to the voice call by voice.

At block 806, user device B detects that the user has selected the option to respond to the voice call via text messaging and records this information in a data store. At block 808, user device B invokes a text messaging application to receive a user response to the voice call. At block 809, user device B receives the user's text response via the text messaging application. At block 810, user device B causes the user's text response to be converted into voice data (e.g., by sending a conversion request to a conversion service provider). At block 812, user device B causes the voice data to be provided to user device A (e.g., sending it to the carrier network). Alternatively, the conversion service provider can send the voice data to user device A via the carrier network. If the user does not select the option to respond to the voice call via text messaging (i.e., the user prefers to use the same modality as the other user), user device B captures the voice response, and causes the voice response to be provided to user device A, without performing a conversion.

At block 814, user device B receives new voice data from user device A. At block 816, user device B determines, based on information in the data store, that the new voice data should be converted. At block 818, user device B causes the new voice data to be converted into text data. At block 820, user device B triggers the text messaging application to present the text data to the user of user device B.

Figure 9:
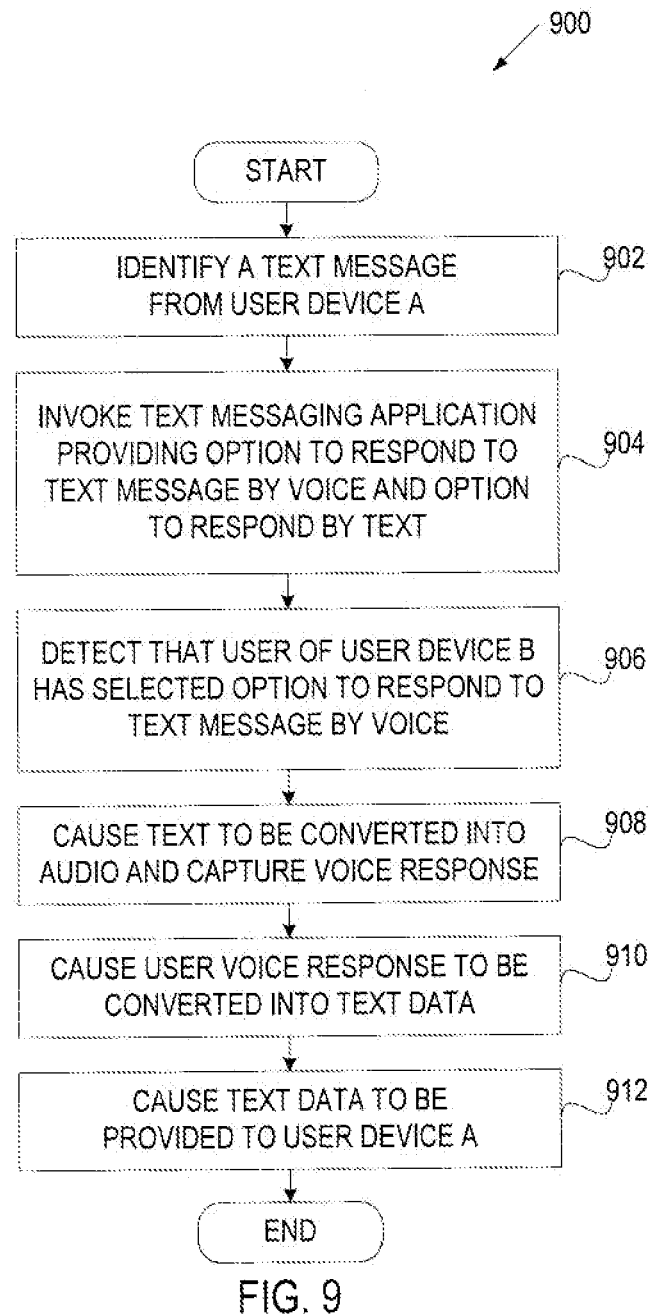
FIG. 9 is a flow diagram of another embodiment of a method for facilitating cross-modality interactions using direct communication between a user device and a conversion service provider.

FIG. 9 is a flow diagram of another embodiment of a method 900 for facilitating cross-modality interactions using direct communication between a user device and a conversion service provider. At block 902, user device B identifies a text message from user device A. At block 904, user device B invokes a text messaging application, which provides an option to respond to the text message by voice and an option to respond to the text message in text form.

At block 906, user device B detects that the user has selected the option to respond to the text message by voice, records this information in a data store, and requests a conversion service provider to convert the text message into audio. At block 908, user device B invokes a phone call application to allow the user to listen to the audio and to provide a voice response, and captures the user's voice response. At block 910, user device B causes the user's voice response to be converted into text data (e.g., by sending a conversion request to the conversion service provider). At block 912, user device B causes the text data to be provided to user device A (e.g., sending it to the carrier network). Alternatively, the conversion service provider can send the text data to user device A (e.g., via the carrier network). If the user does not select the option to respond to the text message by voice (i.e., the user prefers to use the same modality as the other user), user device B presents the text message to the user of user device B, and causes the user's text response to be provided to user device A, without performing a conversion.

Figure 10:
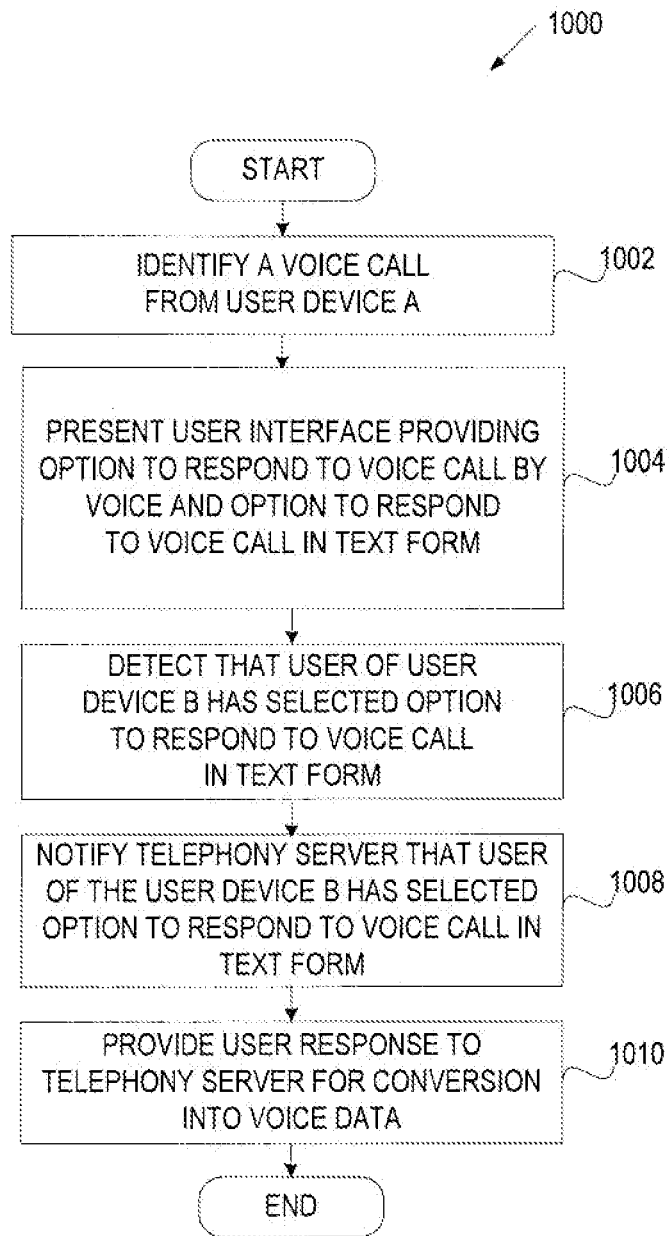
FIG. 10 is a flow diagram of one embodiment of a client-side method for facilitating cross-modality interactions using a telephony server.

FIG. 10 is a flow diagram of one embodiment of a client-side method 1000 for facilitating cross-modality interactions using a telephony server. At block 1002, user device B identifies a voice call from user device A (e.g., when the voice call is bridged to user device B by the telephony server). At block 1004, user device B presents a voice call interface that provides an option to respond to the voice call via text messaging and an option to respond to the voice call by voice.

At block 1006, user device B detects that the user has selected the option to respond to the voice call via text messaging. At block 1008, user device B notifies the telephony server about the user selection. At block 1010, user device B provides a text messaging interface to receive a user response to the voice call, and provides the user response to the telephony server. If the user does not select the option to respond to the voice call via text messaging (i.e., the user prefers to use the same modality as the other user), user device B captures the voice response via the voice call interface, and provides the voice response to the telephony server.

Figure 11:
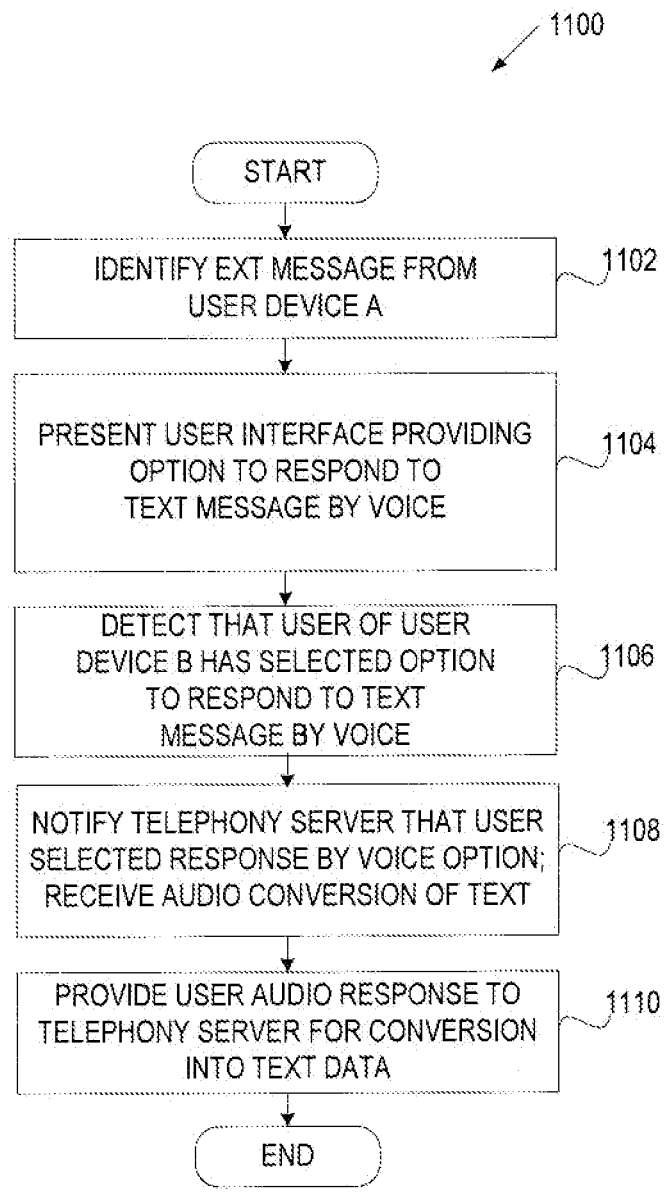
FIG. 11 is a flow diagram of another embodiment of a client-side method for facilitating cross-modality interactions using a telephony server.

FIG. 11 is a flow diagram of another embodiment of a client-side method 1100 for facilitating cross-modality interactions using a telephony server. At block 1102, user device B identifies a text message from user device A (e.g., when the text message is routed to user device B by the telephony server). At block 1104, user device B presents a text messaging interface that provides an option to respond to the text message by voice and an option to respond to the text message in text form.

At block 1106, user device B detects that the user has selected the option to respond to the text message by voice. At block 1108, user device B notifies the telephony server about the user selection and receives an audio conversion of the text message from the telephony server. At block 1110, user device B provides a voice call interface to allow the user to hear the audio and to receive the user's audio response, and then provides the user's audio response to the telephony server. If the user does not select the option to respond to the text message by voice (i.e., the user prefers to use the same modality as the other user), user device B presents the text message to the user of user device B, and provides the user's text response to the telephony server.

Figure 12:
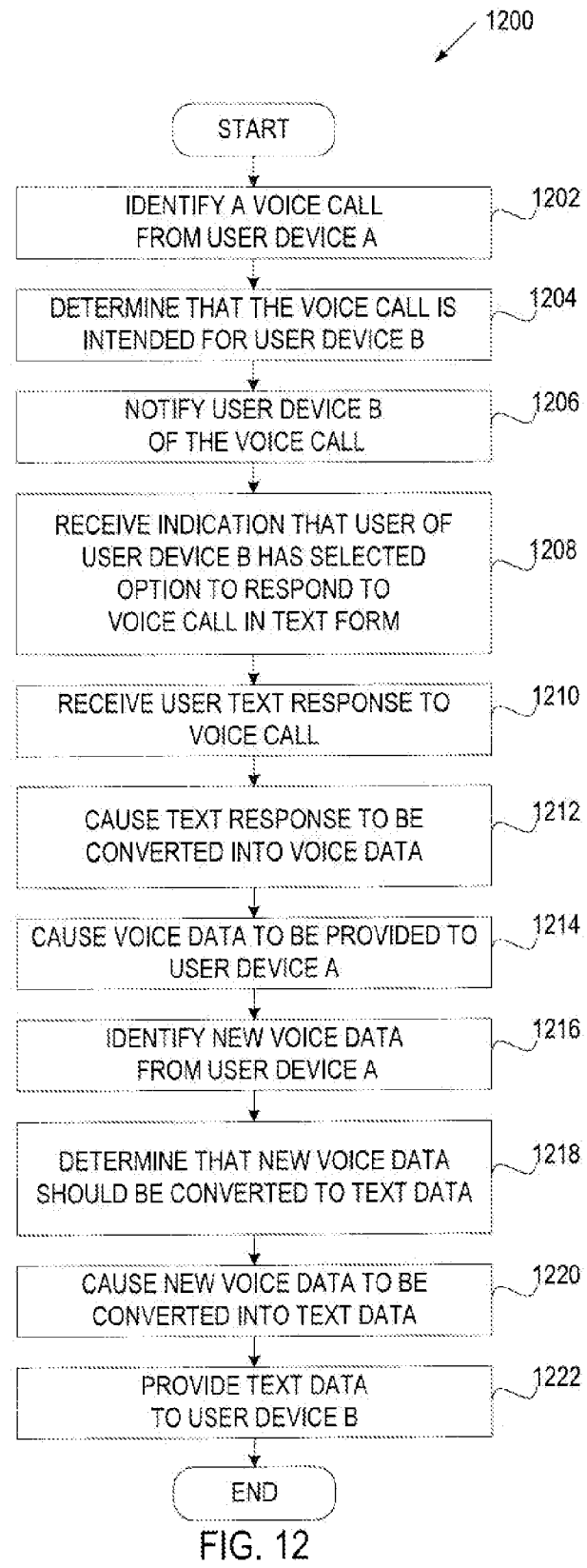
FIG. 12 is a flow diagram of one embodiment of a telephony server method for facilitating cross-modality interactions.
Figure 13:
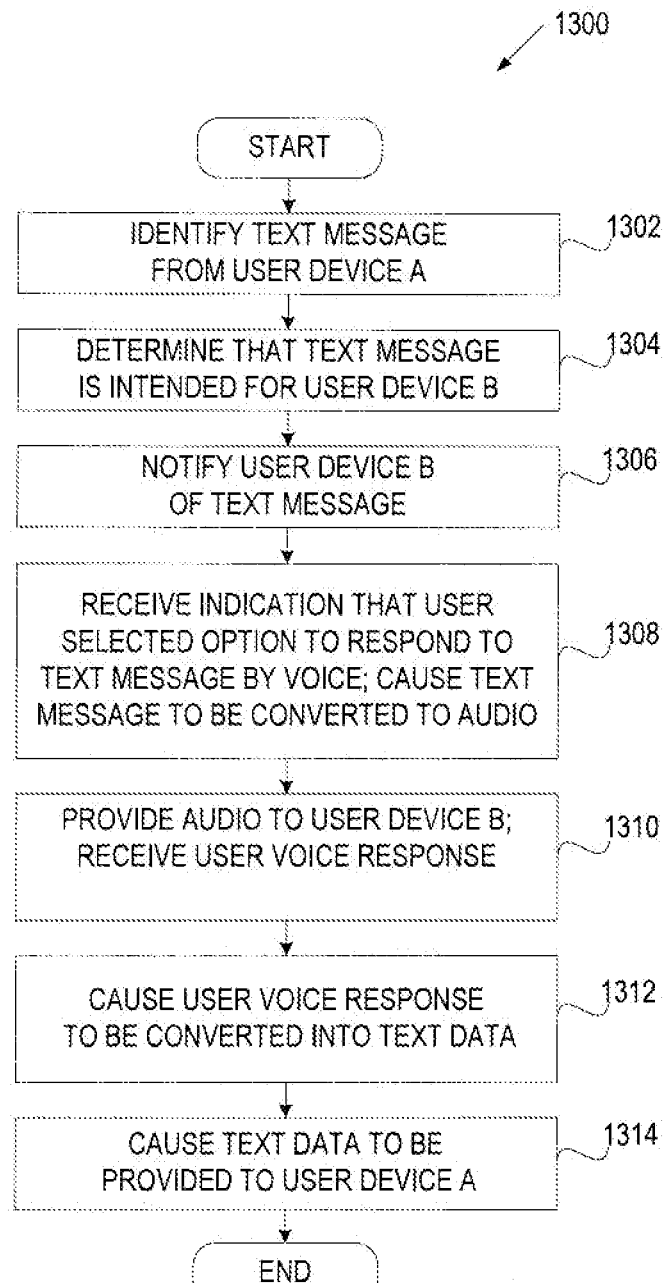
FIG. 13 is a flow diagram of another embodiment of a telephony server method for facilitating cross-modality interactions.

FIGS. 12 and 13 are flow diagrams of some embodiments of server-side methods. The methods are performed by processing logic that may comprise hardware (circuitry, dedicated logic, etc.), software (such as is run on a general purpose computer system or a dedicated machine), or a combination of both. In one embodiment, the methods are performed by a telephony server (e.g., a call conversion manager 122 of telephony server 120 of FIG. 1).

FIG. 12 is a flow diagram of one embodiment of a telephony server method 1200 for facilitating cross-modality interactions. At block 1202, the telephony server identifies a voice call from user device A. At block 1204, the telephony server determines that the voice call is intended for user device B based on the phone number used for the voice call. At block 1206, the telephony server notifies user device B about the voice call.

At block 1208, the telephony server receives an indication from user device B that the user of user device B has selected an option to respond to the voice call via text messaging, and records this information in a data store. At block 1210, the telephony server receives the user's text response to the voice call. At block 1212, the telephony server causes the user's text response to be converted into voice data (e.g., by sending a conversion request to a conversion service provider). At block 1214, the telephony server causes the voice data to be provided to user device A (e.g., sending it to the carrier network). Alternatively, if the user does not select the option to respond to the voice call via text messaging (i.e., the user prefers to use the same modality as the other user), the telephony server causes the voice response to be provided to user device A, without performing a conversion.

At block 1216, the telephony server receives new voice data from user device A. At block 1218, the telephony server determines, based on information in the data store, that the new voice data should be converted. At block 1220, the telephony server causes the new voice data to be converted into text data. At block 1222, the telephony server provides the text data to user device B.

FIG. 13 is a flow diagram of another embodiment of a telephony server method 1300 for facilitating cross-modality interactions. At block 1302, the telephony server receives a text message from user device A. At block 1304, the telephony server determines that the text message is intended for user device B based on the phone number used for the text message. At block 1306, the telephony server notifies user device B about the text message.

At block 1308, the telephony server receives an indication from user device B that the user of user device B has selected an option to respond to the text message by voice, records this information in a data store, and causes the text message to be converted into audio. At block 1310, the telephony server provides the audio to user device B, and receives the user's voice response to the audio conversion of the text message. At block 1312, the telephony server causes the user's voice response to be converted into text data. At block 1314, the telephony server causes the text data to be provided to user device A. Alternatively, if the user does not select the option to respond to the text message by voice (i.e., the user prefers to use the same modality as the other user), the telephony server provides the text message to user device B and causes the user's text response to be provided to user device A, without performing a conversion.

Figure 14:
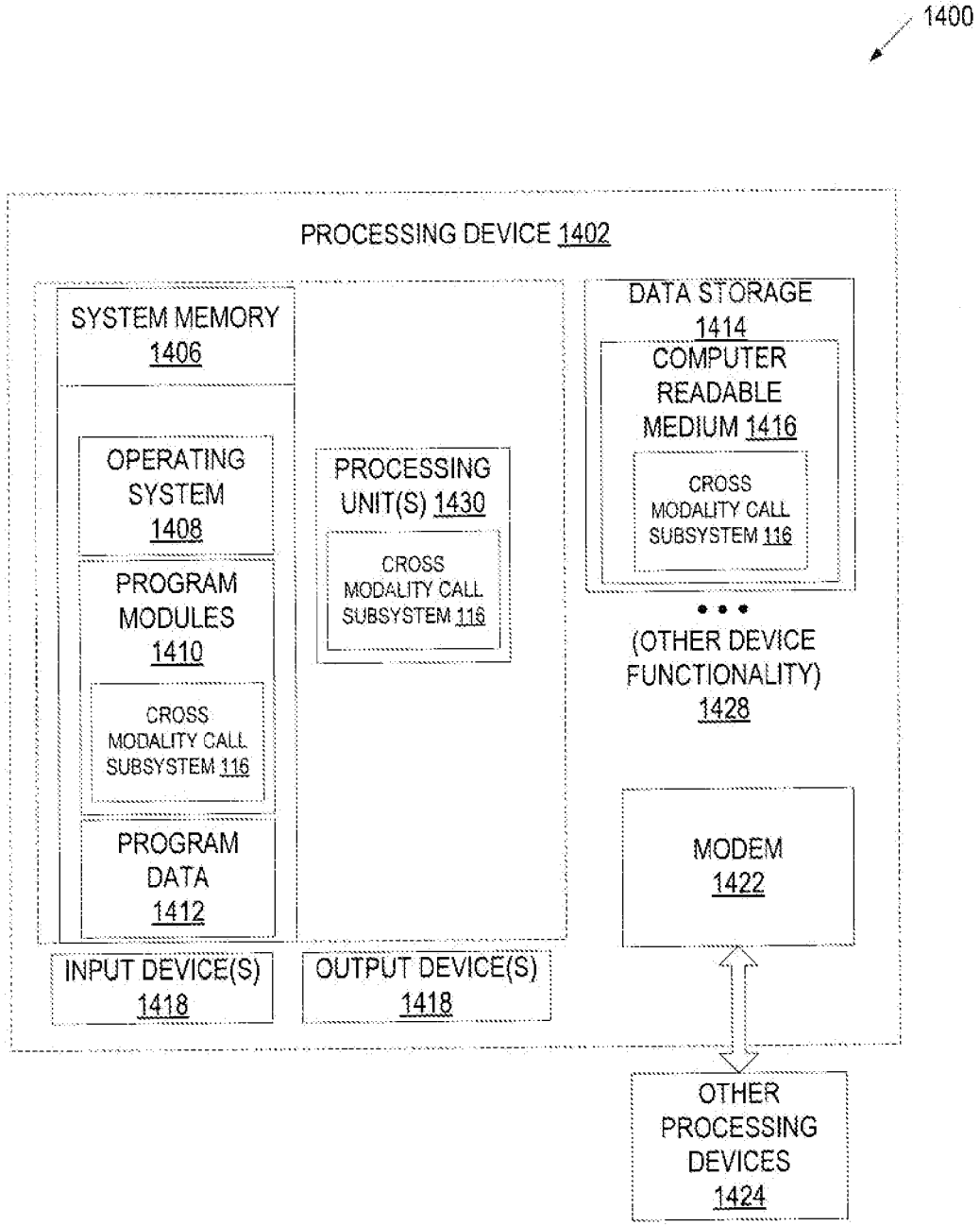
FIG. 14 is a block diagram illustrating an exemplary user device.

FIG. 14 is a block diagram illustrating an exemplary user device 1400. The user device 1400 may be the same as user device 102 of FIG. 1 and may be any type of computing device such as an electronic book reader, a PDA, a mobile phone, a laptop computer, a portable media player, a tablet computer, a camera, a video camera, a netbook, a desktop computer, a gaming console, a DVD player, a media center, and the like.

The user device 1400 includes one or more processing units 1404, such as one or more CPUs. The user device 1400 also includes system memory 1406, which may correspond to any combination of volatile and/or non-volatile storage mechanisms. The system memory 1406 may store information which provides an operating system component 1408, various program modules 1410 including call conversion agent 116, program data 1412, and/or other components. The user device 1400 performs functions by using the processing unit(s) 1404 to execute the cross modality call subsystem 116 and other instructions provided by the system memory 1406.

The user device 1400 may also include a data storage device 1414 that may consist of one or more types of removable storage and/or one or more types of non-removal storage. The data storage device 1414 may include a computer-readable medium 1416 on which is stored one or more sets of instructions (e.g., instructions of the cross modality call subsystem 116) embodying any one or more of the methodologies or functions described herein. As shown, instructions of the cross modality call subsystem 116 may also reside, completely or at least partially, within the system memory 1406 and/or within the processing unit(s) 1430 during execution thereof by the user device 1400, the system memory 1406 and the processing unit(s) 1430 also constituting computer-readable media. The instructions of the cross modality call subsystem 116 may further be transmitted or received over a network.

The user device 1400 may also include one or more input devices 1418 (keyboard, mouse device, specialized selection keys, etc.) and one or more output devices 1420 (displays, printers, audio output mechanisms, etc.). The user device 1400 may further include a wireless modem 1422 to allow the user device 1400 to communicate via a wireless network with other computing devices 1424, such as remote computers, the service provider server 104, and so forth. The wireless modem 1422 may allow the user device 1400 to receive a voice call and also communicate with the service provider server 104 in a data mode. The wireless modem 1422 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed downlink packet access (HSDPA), WiFi, long term evaluation (LTE) and WiMax.

The above-enumerated list of modules is representative and is not exhaustive of the types of functions performed by the user device 1400. As indicated by the label "Other Device Functionality" 1428, the user device 1400 may include additional functions.

Figure 15:
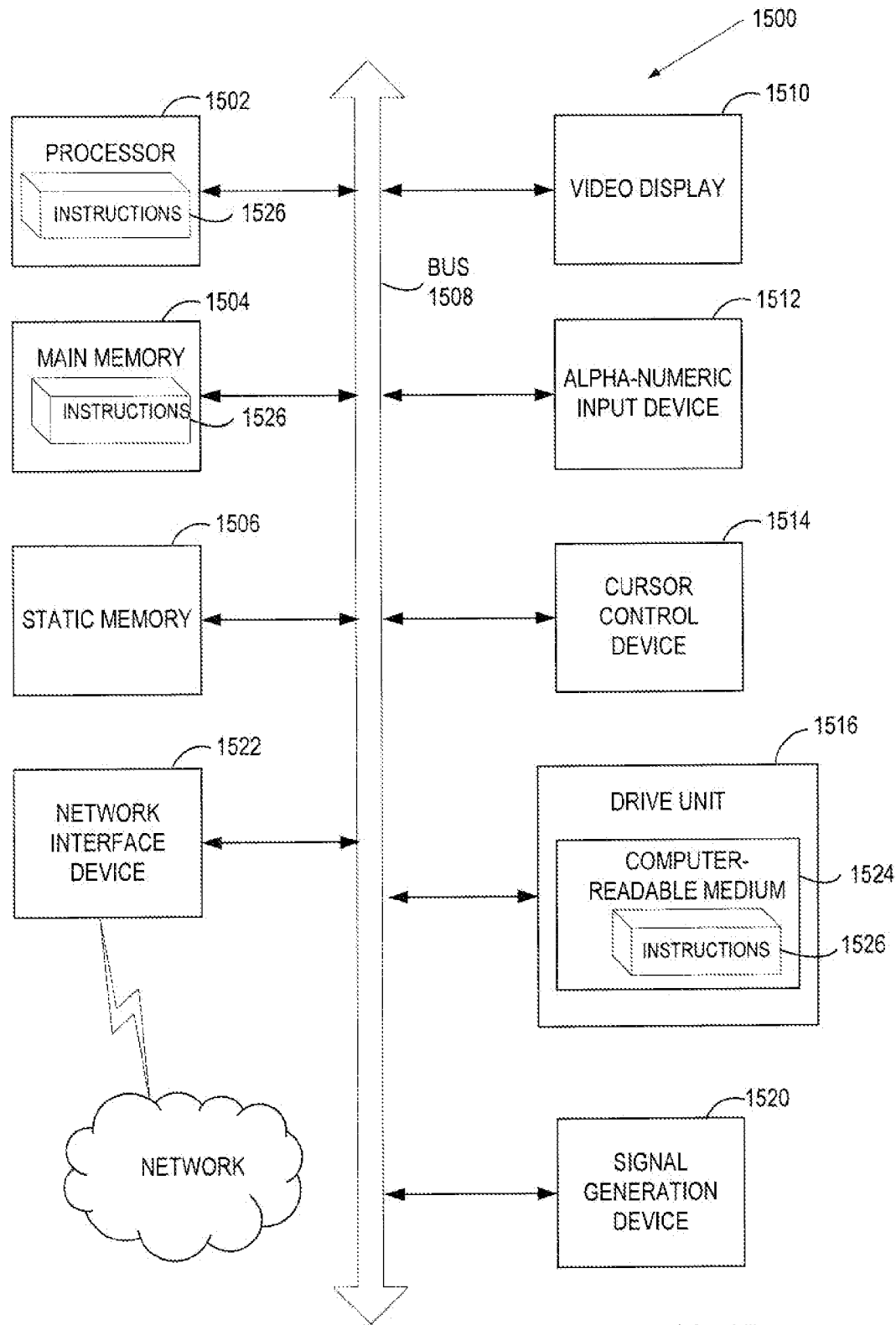
FIG. 15 illustrates an exemplary server facilitating cross modality interactions between users.

FIG. 15 illustrates an exemplary server 1500 that facilitates cross modality interactions between users. The server 1500 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1500 includes a processing system (processor) 1502, a main memory 1504 (e.g., read-only memory (ROM), flash memory, dynamic random access memory (DRAM) such as synchronous DRAM (SDRAM)), a static memory 1506 (e.g., flash memory, static random access memory (SRAM)), and a data storage device 1516, which communicate with each other via a bus 1506.

Processor 1502 represents one or more general-purpose processing devices such as a microprocessor, central processing unit, or the like. More particularly, the processor 1502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1502 may also be one or more special-purpose processing devices such as an application specific integrated circuit (ASIC), a field programmable gate array (FPGA), a digital signal processor (DSP), network processor, or the like. The processor 1502 is configured to execute the call conversion manager 122 for performing the operations and steps discussed herein.

The computer system 1500 may further include a network interface device 1522. The computer system 1500 also may include a video display unit 1510 (e.g., a liquid crystal display (LCD) or a cathode ray tube (CRT)), an alphanumeric input device 1512 (e.g., a keyboard), a cursor control device 1514 (e.g., a mouse), and a signal generation device 1520 (e.g., a speaker).

The data storage device 1516 may include a computer-readable medium 1524 on which is stored one or more sets of instructions (e.g., instructions of call conversion manager 122) embodying any one or more of the methodologies or functions described herein. The call conversion manager 122 may also reside, completely or at least partially, within the main memory 1504 and/or within the processor 1502 during execution thereof by the computer system 1500, the main memory 1504 and the processor 1502 also constituting computer-readable media. The call conversion manager 122 may further be transmitted or received over a network 1520 via the network interface device 1522.

While the computer-readable storage medium 1524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    identifying, by a first user device, a voice call originating from a second user device;
    invoking a phone call application at the first user device, the phone call application providing an option to respond to the voice call by voice and an option to respond to the voice call via text messaging;
    detecting that a user of the first user device has selected the option to respond to the voice call via text messaging;
    invoking a text messaging application to receive a user response to the voice call;
    causing the user response to be converted into voice data; and
    causing the voice data to be provided to the second user device.

2. The method of claim 1 wherein causing the user response to be converted into voice data comprises:
    sending the user response to a network server for conversion into the voice data; and
    receiving the voice data from the network server.

3. The method of claim 1 further comprising:
    receiving second voice data at the first user device;
    determining that the second voice data is associated with the voice call from the second user device;
    causing the second voice data to be converted into text data; and
    invoking the text messaging application to present the text data to the user of the first user device.

4. The method of claim 3 wherein the text messaging application presents the text data in a form of a conversation between the user of the first user device and a user of the second user device.

5. The method of claim 1 wherein the voice call is one or more of a point-to-point call, a teleconference call, a video conference call, or a web conference call.

6. The method of claim 1 further comprising:
    identifying, by the first user device, a text message originating from the second user device or from a third user device;
    invoking the text messaging application at the first user device, the text messaging application providing an option to respond to the text message by voice;
    detecting that the user of the first user device has selected the option to respond to the text message by voice;
    triggering the phone call application to capture a user voice response;
    causing the user voice response to be converted into text data; and
    causing the text data to be sent to the originator of the text message.

7. The method of claim 6 wherein the text message is intended for one or more other users, in addition to the user of the first user device, as part of a group text messaging interaction.

8. A computer-implemented method comprising:
    identifying, by a first user device, a voice call originating from a second user device;
    presenting a user interface to a user of the first user device, the user interface providing an option to respond to the voice call by voice and an option to respond to the voice call in a text form;
    detecting that the user of the first user device has selected the option to respond to the voice call in the text form; and
    causing a user response to the voice call to be converted into voice data.

9. The method of claim 8 wherein identifying the voice call originating from the second user device comprises:
receiving, from a telephony server, a notification of the voice call originating from the second user device.

10. The method of claim 8 wherein causing the user response to the voice call to be converted into voice data comprises:
notifying a telephony server that the user of the first user device has selected the option to respond to the voice call in the text form; and
providing the user response to the telephony server for subsequent conversion into the voice data.

11. The method of claim 8 further comprising:
upon receiving, from a telephony server, second text data associated with the voice call, presenting the second text data to the user of the first user device as part of a conversation between the user of the first user device and a user of the second user device.

12. The method of claim 8 further comprising:
identifying, by the first user device, a text message originating from the second user device or from a third user device;
presenting a user interface to the user of the first user device, the user interface providing an option to respond to the text message by voice;
detecting that the user of the first user device has selected the option to respond to the text message by voice;
capturing a user voice response; and
sending the user voice response to a telephony server.

13. The method of claim 12 wherein the text message is intended for one or more other users, in addition to the user of the first user device, as part of a group text messaging interaction.

14. A server computer system comprising:
a memory; and
a processing device, coupled to the memory, to:
identify a voice call originating from a first user device;
determine that the voice call is intended for a second user device;
notify the second user device of the voice call;
receive an indication from the second user device that a user of the second user device has selected an option to respond to the voice call in a text form;
receive a response of the user of the second user device to the voice call;
cause the response to the voice call to be converted into voice data; and
cause the voice data to be sent to the first user device.

15. The system of claim 14 wherein the processing device is further to:
obtain a plurality of phone numbers; and
assign one of the plurality of phone numbers to the user of the second user device.

16. The system of claim 15 wherein the processing device is to determine that the voice call is intended for the second user device by determining that the voice call is made to a phone number assigned to the user of the second user device.

17. The system of claim 14 wherein the processing device is to cause the response to the voice call to be converted into voice data by sending the response of the user to a network server for conversion into the voice data.

18. The system of claim 14 wherein the processing device is further to:
identify second voice data originating from the first user device;
determine that the second voice data is associated with the voice call from the first user device;
cause the second voice data to be converted into text data; and
send the text data to the second user device.

19. The system of claim 14 wherein the voice call is one or more of a point-to-point call, a teleconference call, a video conference call, or a web conference call.

20. The system of claim 14 wherein the processing device is further to:
identify a text message originating from the first user device or a third user device;
determine that the text message is intended for the second user device;
notify the second user device of the text message;
receive an indication from the second user device that a user of the second user device has selected an option to respond to the text message by voice;
receive a voice response of the user of the second user device;
cause the voice response to be converted into text data; and
cause the text data to be sent to the originator of the text message.

21. The system of claim 20 wherein the text message originating is intended for one or more other users, in addition to the user of the second user device, as part of a group text messaging interaction.

* * * * *